United States Patent [19]

Nakashima et al.

[11] Patent Number: 4,621,832
[45] Date of Patent: Nov. 11, 1986

[54] SHOCK ABSORBER CONTROL SYSTEM

[75] Inventors: Noriyuki Nakashima, Nagoya; Yoshinori Ishiguro, Kariya; Kohji Kamiya, Chita; Hiroshi Miyata, Toyota; Kazumasa Nakamura, Okazaki; Naoyasu Sugimoto, Toyota, all of Japan

[73] Assignees: Nippondenso Co., Ltd., Kariya; Toyota Jidosha Kabushiki Kaisha, Toyota, both of Japan

[21] Appl. No.: 565,791

[22] Filed: Dec. 27, 1983

[30] Foreign Application Priority Data

Dec. 27, 1982 [JP] Japan .................. 57-229884
Dec. 27, 1982 [JP] Japan .................. 57-229885
Dec. 27, 1982 [JP] Japan .................. 57-229886

[51] Int. Cl.⁴ .................................. B60G 11/28
[52] U.S. Cl. ........................... 280/707; 364/424
[58] Field of Search .......... 280/707, 6.1, DIG. 1; 364/424

[56] References Cited

U.S. PATENT DOCUMENTS 4,361,346 11/1982 Harris ..................... 280/707
4,506,909 3/1985 Nakashima et al. ........ 280/707

FOREIGN PATENT DOCUMENTS 2736026 2/1978 Fed. Rep. of Germany .
1079482 11/1954 France .
56-147107 4/1980 Japan .
149815 9/1983 Japan .................... 707/

OTHER PUBLICATIONS

Patent Abstracts of Japan, vol. 5, No. 97, Jun. 24, 1981 & JP-A-56-42739.
Patent Abstracts of Japan, vol. 7, No. 55, Mar. 5, 1983 & JP-A-57-201707 (Dec. 10, 1982).

Primary Examiner—Joseph F. Peters, Jr.
Assistant Examiner—Kenneth R. Rice
Attorney, Agent, or Firm—Cushman, Darby & Cushman

[57] ABSTRACT

A shock absorber control system controls vehicle shock absorbers by bringing them selectively into a softer dampening mode or a harder dampening mode in response to operation of a steering wheel of a vehicle. The shock absorbers are changed from the softer to the harder dampening mode only when the vehicle speed is higher than a reference vehicle speed and the steering wheel is turned at an angular velocity greater than a predetermined reference angular velocity. The angular velocity of rotation of the steering wheel is used as a parameter to select one of the softer and harder dampening modes only when the vehicle wheel has been angularly moved beyond a certain reference angle dependent on the vehicle speed. Therefore, no unwanted switching between the softer and harder dampening modes takes place when the steering wheel is angularly moved back and forth through relatively small angles. The harder dampening mode continues for a preset interval of time.

9 Claims, 8 Drawing Figures

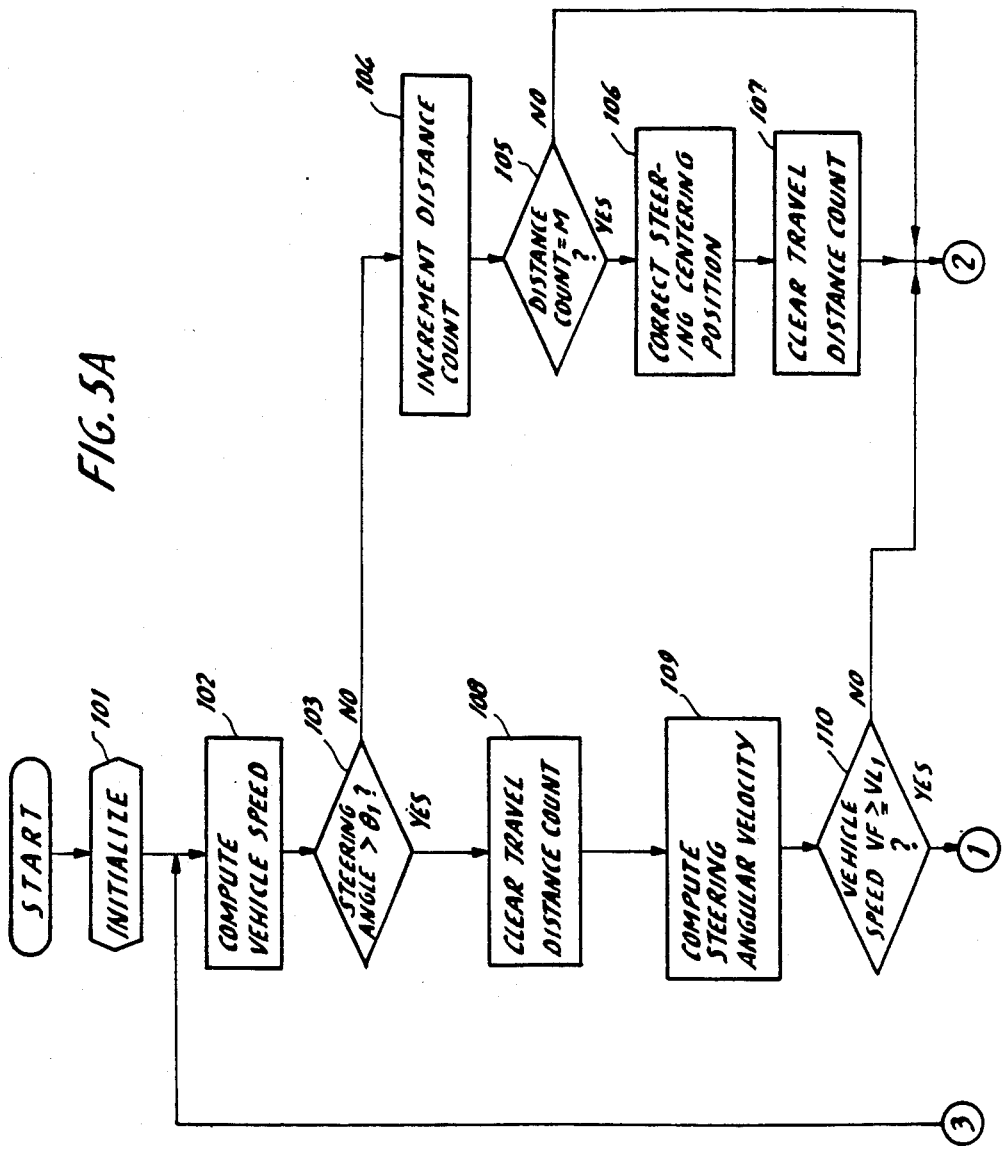

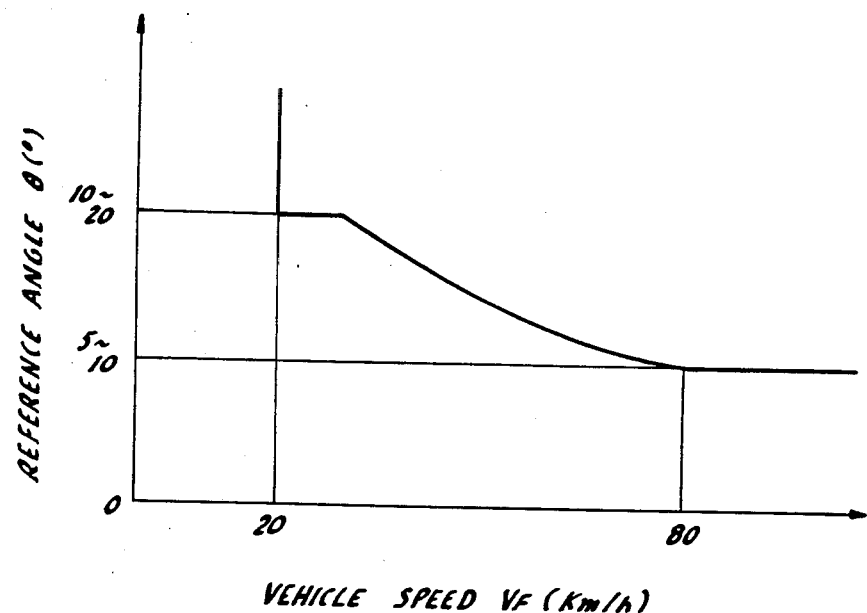

SHOCK ABSORBER CONTROL SYSTEM

BACKGROUND OF THE INVENTION

The present invention relates to a shock absorber control system, and more particularly to a shock absorber control system for controlling vehicle shock absorbers to allow a vehicle such as an automobile to turn around corners under stable conditions.

Known shock absorber control systems for use on vehicles control shock absorbers by adjusting their dampening forces in response to applied electric signals. When an angular velocity of rotation of a steering wheel or shaft exceeds a predetermined value, the shock absorber control system controls the shock absorbers to operated in a harder dampening mode. It is customary for the driver to move the steering wheel unintentionally slightly back and forth while the vehicle is running. This impairs the "feeling" the driver has while driving the vehicle since the shock absorbers are caused to switch between harder and softer dampening modes each time the steering angular velocity happens to exceed the predetermined value even upon such unintentional back-and-forth angular movement of the steering wheel.

One conventional shock absorber control system for adjusting shock absorber dampening forces in response to electric signals is disclosed in Japanese Laid-Open Utility Model Publication No. 56-147107 published on Apr. 8, 1980.

It is known that the angular velocity of a vehicle steering wheel as it is manipulated by the driver is liable to be lower when the steering wheel is turned than when it is returned. More specifically, when the vehicle enters a curved road, the steering wheel is turned by the driver at a relatively low angular velocity. However, when the vehicle runs out of the curved road, the steering wheel is returned at a relatively high speed since it is usually returned of its own accord.

The prior shock absorber control system utilizes only the angular velocity of the steering shaft as a parameter when the steering wheel is either turned or returned. Therefore, the shock absorbers remain in the harder dampening mode when the steering sheel is returned, though the softer dampening mode is preferable at that time for a better driver's feeling.

SUMMARY OF THE INVENTION

It is an object of the present invention to provide a shock absorber control system capable of controlling shock absorbers dependent on the direction of rotation of a steering wheel as a controlling parameter.

Another object of the present invention is to provide a shock absorber control system having means for preventing shock absorbers from switching alternately between softer and harder dampening modes while an angle of rotation of a steering wheel is kept within a predetermined range.

According to the present invention, there is provided a shock absorber control system for controlling at least one shock absorber having a dampening force adjustable in response to operation of a steering shaft of a vehicle, the shock absorber control system comprising signal generator means for generating a signal in response to operation of the steering shaft, and control means including first means responsive to the signal from the signal generator means for determining whether the steering shaft is turned or returned, second means responsive to the signal from the signal generator means for computing an angular velocity of operation of the steering shaft, third means for comparing the computed angular velocity with a reference value to issue a first signal indicative of an increased dampening force when the computed angular velocity exceeds the reference angular velocity and to issue a second signal indicative of a reduced dampening force when the computed angular velocity is below the reference angular velocity, the reference angular velocity being smaller when the steering shaft is determined as being turned by the second means than when the steering shaft is determined as being returned, and fourth means for actuating the shock absorber to selectively produce the increased and reduced dampening forces in response to the first and second signals, respectively. The third means may be arranged for comparing the computed angular velocity with a first reference value to issue a first signal indicative of an increased dampening force when the computed angular velocity exceeds the first reference angular velocity, for comparing the computed angular velocity with a second reference angular velocity when the computed angular velocity is smaller than the first reference angular velocity, and for issuing a second signal indicative of a reduced dampening force a period of time after the computed angular velocity falls below the second reference angular velocity.

BRIEF DESCRIPTION OF THE DRAWINGS

The present invention will be described in detail by way of illustrative example with reference to the accompanying drawings, in which;

FIGS. 5A and 5B are a flowchart illustrative of steps of operation of the shock absorber control system for controlling the shock absorbers; and FIG. 6 is a diagram showing the relationship between a reference angle and a vehicle speed.

DETAILED DESCRIPTION

Figure 1:
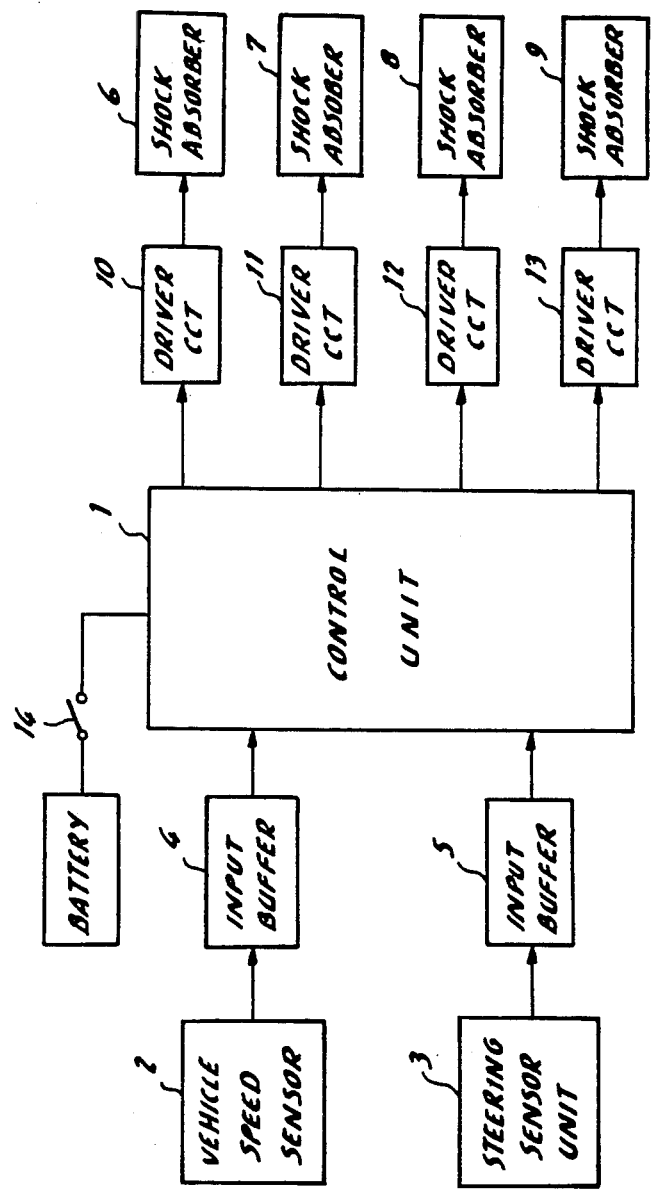
FIG. 1 is a block diagram of a shock absorber control system according to the present invention.

FIG. 1 shows in block form a shock absorber control system according to the present invention. The shock absorber control system is particularly suitable when incorporated in a vehicle such as an automobile.

The shock absorber control system comprises a control unit 1 in the form of a microcomputer, a vehicle speed sensor 2 for producing a pulse signal having a frequency proportional to a vehicle speed as detected, a steering sensor unit 3 for producing pulse signals composed of pulses proportional to a steering angle through which a steering wheel has been rotated, an input buffer 4 connected between the vehicle speed sensor 2 and the control unit 1, and another input buffer 5 connected between the steering sensor unit 3 and the control unit 1.

The vehicle has four wheels, for example, with which four shock absorbers 6, 7, 8, 9 are respectively associated. The shock absorbers 6, 7, 8, 9 are adjustable in their dampening forces in response to electric signals applied thereto as described later on. The shock absorber control system also includes four driver circuits 10, 11, 12, 13 connected to the control unit 1 for actuating the shock absorbers 6, 7, 8, 9, respectively, in response to control signals issued from the control unit 1. The control unit 1 can be energized or de-energized by a key switch 14 connected to a battery carried on the vehicle.

The vehicle speed sensor 2 is of a known construction which may comprise a photoelectric transducer, an electromagnetic pickup, or electric contacts, for example. The vehicle speed sensor 2 is disposed on a transmission (not shown) of the vehicle for generating the pulse signal in synchronism with the rotation of transmission gears. The vehicle speed can be determined from the frequency of the pulse signal, and the distance that the vehicle has travelled can be determined from the number of pulses produced by the vehicle speed sensor.

The steering sensor unit 3 is also of a known construction which may be composed of photoelectric transducers, electromagnetic pickups, or electric contacts, for example. The steering sensor unit 3 is located in the vicinity of a steering shaft for generating a pulse signal commensurate with the angular speed of rotation of the steering wheel.

Figure 2:
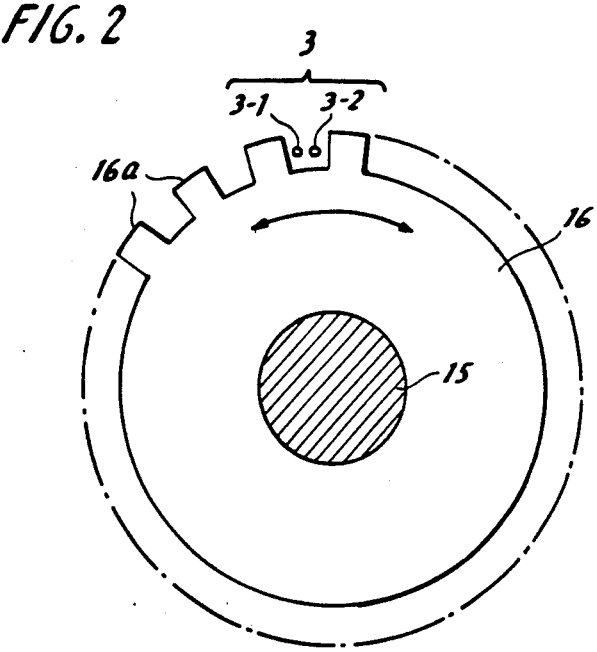
FIG. 2 is front elevational view of a steering sensor unit composed of a pair of steering sensors and a steering shaft disk.
Figure 3A:
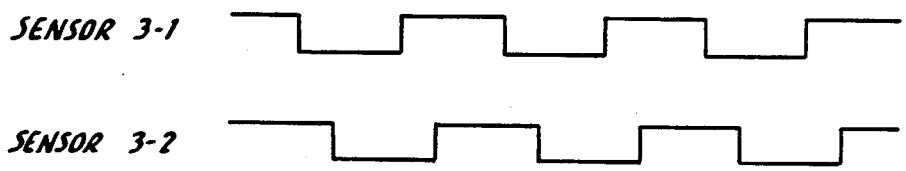
FIGS. 3A and 3B are diagrams showing the waveforms of output signals from the steering sensors.
Figure 3B:
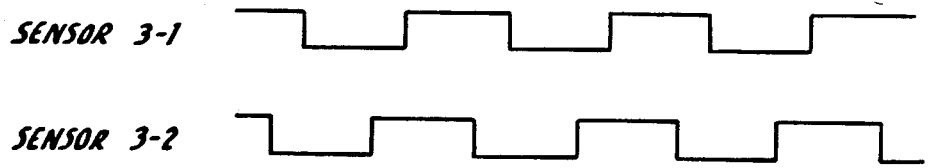

FIG. 2 shows the steering sensor unit 3 in greater detail. The steering sensor unit 3 comprises a pair of steering sensors 3-1, 3-2 in the form of photoelectric transducers fixedly positioned adjacent to a steering shaft 15, and a rotatable disk 16 mounted on the steering shaft 15 and having a series of angularly equally spaced teeth 16a. The steering sensors 3-1, 3-2 are spaced from each other around the steering shaft 15 and positioned in confronting relation to the teeth 16a of the disk 16. The steering sensor unit 3 also includes a pair of light sources (not shown) disposed in confronting relation to the steering sensors 3-1, 3-2, respectively, with the disk 16 interposed therebetween at the teeth 16a thereof. Therefore, beams of light emitted from the light sources intermittently fall on the corresponding steering sensors 3-1, 3-2 when the disk 16 rotates. When the disk 16 rotates clockwise in FIG. 2, the steering sensors 3-1, 3-2 produce output signals having waveforms as shown in FIG. 3A. Conversely, when the disk 16 rotates counterclockwise in FIG. 2, the steering sensors 3-1, 3-2 produce output signals having waveforms as shown in FIG. 3B. Accordingly, the direction in which the steering shaft 15 rotates can be determined by the waveforms of output signals generated by the steering sensors 3-1, 3-2. In addition, the angular speed of rotation of the steering shaft 15 can be determined from the frequency of the pulses of the output signal from each of the steering sensors 3-1, 3-2, and the angle through which the steering shaft 15 has rotated can be determined from the number of pulses generated by each of the steering sensors 3-1, 3-2.

In order to determine whether a steering wheel is turned or returned, it is necessary to establish a centering position for the steering wheel. The centering position for the steering wheel cannot be defined accurately because of variations in the parts of which the steering mechanism is composed, variations in assembled conditions, and other factors. Since the steering wheel is angularly moved through relatively small angles while the vehicle is running along a straight course, the vehicle can be regarded as moving along a straight course when the steering angle is continuously kept within a certain angle range for a certain distance of travel, and the steering position at that time is determined as a temporary centering position. A true centering position for the steering wheel can then be expressed by:

True centering position = $\{(A \times \text{next previous true centering position} + B \times \text{temporary centering position})\}/(A+B)$ where $A > B$; $A = 15/16$ and $B = 1/16$, for example. An initial value for the next previous true centering position may correspond to the steering position assumed when the key switch is turned on.

Figure 4:
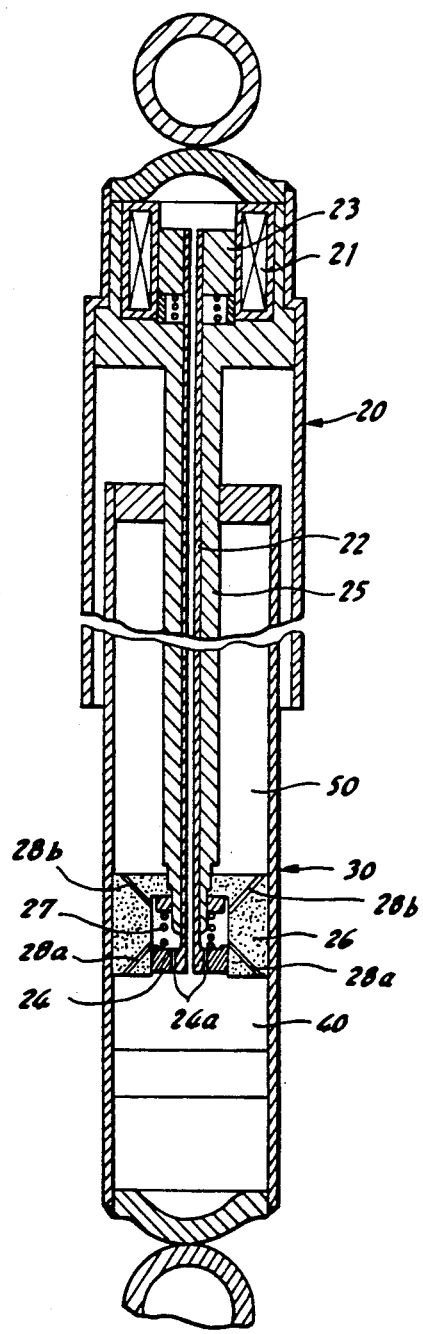
FIG. 4 is a fragmentary longitudinal cross-sectiohal view of a shock absorber to be controlled by the shock absorber control system of the present invention.

Each of the shock absorbers 6 through 9 is schematically shown in cross section in FIG. 4.

The shock absorber comprises an upper movable cylinder 20 having therein a coil 21 electrically connected to one of the driver circuits 10, 11, 12, 13, and an annular core 23 disposed in the coil 21, and a connecting rod 22 attached at one end to and extending coaxially from the annular core 23. The annular core 23 and the connecting rod 22 are moved upwardly and held in an upper position under magnetic forces generated when the coil 21 is energized. The connecting rod 22 has on its opposite end a flow control valve 24 having through passageways 24a. A piston rod 25 is fitted over the connecting rod 22 and supports on its distal end a piston 26 in which the flow control valve 24 is slidably disposed. The piston 26 and the flow control valve 24 define a valve chamber 27 therebetween. The shock absorber also includes a lower cylinder 30 telescopically mounted in the upper cylinder 20 and has first and second oil chambers 40, 50 one on each side of the piston 26. The valve chamber 27 communicates with the first oil chamber 40 through passages 28a defined in the piston 26 and the passageways 24a, and with the second chamber 50 through passages 28b defined in the piston 26.

When the coil 21 is de-energized, the flow control valve 24 is in its lowest position relative to the piston 26 as shown in FIG. 4. In this position, the passages 28a are not closed by the flow control valve 24, and hence oil can flow relatively smoothly between the first and second oil chambers 40, 50 through the passages 28a and the passageways 24a. Stated otherwise, each of the shock absorbers 6, 7, 8, 9 has its dampening force kept at a normal level or lower level. Therefore, each shock absorber is capable of producing a relatively weak dampening force. The mode in which the shock absorber produces a relatively weak dampening force will hereinafter be referred to as a "softer dampening mode".

When the coil 21 is energized by one of the driver circuits 10, 11, 12, 13, the core 23 and hence the connecting rod 22 are moved upwardly under magnetic forces generated by the coil 21, so that the flow control valve 24 closes the passages 28a. Then, the oil flows between the first and second chambers 40, 50 through the passageways 24a and the passages 28b, and hence the oil flow is subjected to a higher resistance. Accordingly, each of the shock absorbers 6, 7, 8, 9 has its dampening force increased to a higher level. As long as the coil 21 is kept energized, the passages 28a remain closed by the flow control valve 24, and each shock absorber produces a relatively strong dampening force. The mode in which the shock absorber produces a relatively strong dampening force will hereinafter referred to as a "harder dampening mode".

Operation of the shock absorber control system will be described with reference to FIGS. 5 and 6.

Figure 5B:
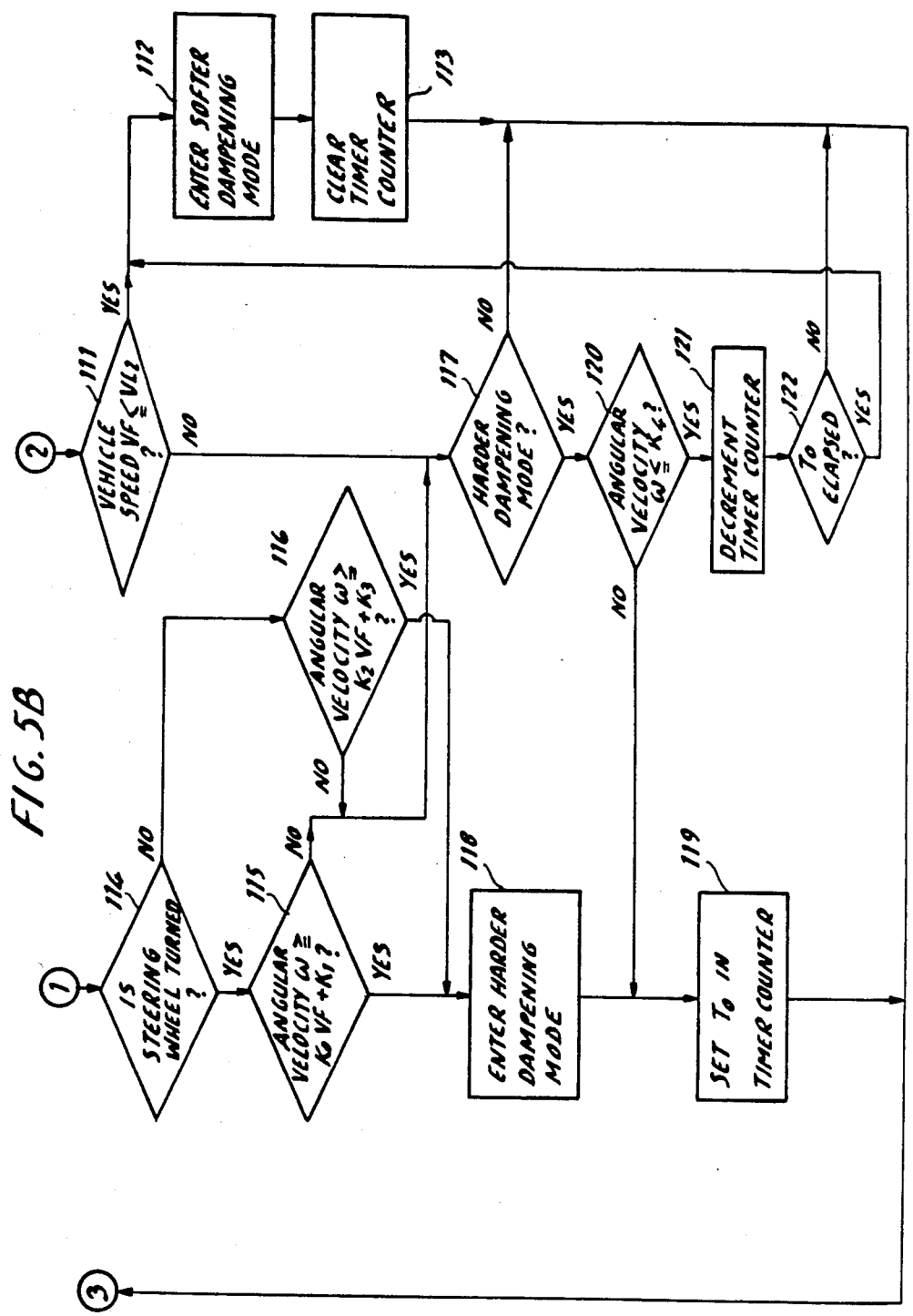

The control unit 1 is programmed to initiate a process as shown in FIG. 5 when the key switch 14 is turned on.

When the programmed process is started, initialization is effected in a step 101 in preparation for subsequent processing steps.

Then, a vehicle speed VF is computed in a step 102 based on an output signal from the vehicle speed sensor 2. Where the vehicle speed sensor 2 is designed to generate four pulses, for example, while a vehicle wheel makes one revolution, the vehicle speed VF is computed in the step 102 by dividing the distance that the vehicle travels in one revolution of the vehicle wheel by a period of time taken after an ith pulse from the vehicle speed sensor 2 is applied until an (i+4)th pulse produced thereby is impressed.

The program then goes to a step 103 which computes an angle of rotation of the steering wheel (hereinafter referred to as a "steering angle") based on the angular steering wheel position as determined by the steeing sensor unit 3 and determines whether the steeing angle is greater than a reference angle $\theta$ or not. The reference angle $\theta$ is related to the vehicle speed VF as illustrated in FIG. 6. If the steering angle does no exceed the reference angle or the angular displacement of the steering wheel is relatively small, then the count of the travel distance as determined by the vehicle speed sensor 2 is incremented in a step 104. A next step 105 determines whether the distance count has reached a distance M or not. If the distance count has reached M, that is, the steering angle remains smaller than the reference angle $\theta$ continuously for the distance M, then a steering centering position is corrected in a step 106, and the distance count is cleared in a step 107 in preparation for a next cycle of travel distance counting.

If the step 103 determines that the steering angle has exceeded the reference angle $\theta$, then the travel distance count is cleared in a step 108 so that no steering centering position is will be corrected.

Therefore, while the steering wheel remains relatively stable or is not angularly moved through a large angle, the NO path from the step 103, including the steps 103, 104, 105, 106, is executed to correct the steering centering position. On the other hand, when the steering wheel is angularly moved through a large angle, no centering position correction is effected, but the YES path from the step 103 is executed to clear the travel distance count in the step 108 and then to compute an angular velocity $\omega$ of the steering wheel or shaft 15, hereinafter referred to as a "steering angular velocity", in a step 109 based on output signals from the steering sensor unit 3. The steering angular velocity $\omega$ is determined as follows: the direction of rotation of the steering shaft 15 is determined on the basis of the out-of-phase output siganls from the steering sensors 3-1, 3-2. Only if the steering shaft 15 is continuously rotated either clockwise or counterclockwise about its own axis, the steering angular velocity $\omega$ is computed as a normal angular velocity. Otherwise, that is, when the steering shaft 15 is angularly moved through small angles about its own axis, or when the steering shaft 15 is frequently angularly moved clockwise and counterclockwise as while the vehicle is running on bumpy terrain, no steering angular velocity $\omega$ is computed. The steering angular velocity $\omega$ can be computed by measuring an interval of time required for the steering shaft or wheel to be angularly moved through the angle $\theta$.

Then, the program reaches a step 110 for determining whether the vehicle speed VF computed in the step 102 is greater than or equal to a first reference vehicle speed $VL_1$, for example a range of from 20 km/h to 40 km/h, which is high enough to demand the harder dampening mode of the shock absorbers 6 through 9. Since the vehicle speed VF is zero immediately after the key switch 14 is turned on, the program goes along the NO path from the step 110 to a step 111 which determines whether the vehicle speed VF is lower than or equal to a second reference vehicle speed $VL_2$, for example 10 km/h, which causes the shock absorbers 6 through 9 to operate in the softer dampening mode unconditionally. With the vehicle speed VF being zero at this time, the program goes out on the YES side of the step 111 to a step 112 that controls the shock absorbers 112 to be shifted to the softer dampening mode. Then, a timer counter is cleared in a step 113.

Until the vehicle speed VF exceeds the second reference vehicle speed $VL_2$ after the key switch 14 has been turned on, a closed loop composed of the steps 102 through 107 and the steps 111 through 113 or a closed loop composed of the steps 102, 103, 108 through 113 is selectively executed at all times to keep the shock absorbers 6 through 9 in the softer dampening mode. During this time, the steering centering position is corrected as the steering shaft is angularly moved.

When the vehicle speed VF exceeds the second reference vehicle speed $VL_2$, the program goes along the NO path from the step 111 to a step 117 which determines whether the shock absorbers 6 through 9 are now controlled in the harder dampening mode. Since the shock absorbers 6 through 9 are in the softer dampening mode at this time, the program returns through the NO path from the step 117 to the step 102. Therefore, the shock absorbers 6 through 9 are maintained in the softer dampening mode until the vehicle speed VF becomes higher than the first reference vehicle speed $VL_1$.

When the vehicle speed VF exceeds the first reference vehicle speed $VL_1$ and the steering shaft is angualrly moved beyond the reference angle $\theta$, the program goes through the YES path from the step 110 to a step 114 that determines whether the steering wheel is turned or not (returned). If the steering wheel is turned, then the program proceeds to a step 115 for determining whether the steering angular velocity $\omega$ as computed in the step 109 is greater than or equal to a first reference angular velocity $K_0 VF + K_1$ ($K_0$ is a negative constant and $K_1$ is a positive constant). If the steering angular velocity $\omega$ is decided upon as being lower than the first reference angular velocity $K_0 VF + K_1$, that is, if the steering wheel is actuated by the operator relatively moderately, not abruptly, in view of running conditions of the vehicle, then the program goes out on the NO side of the step 115 to the step 117. Because the shock absorbers 6 through 9 are in the softer dampening mode at this time, the program goes along the NO path from the step 117 back to the step 102. Therefore, when the steering angular velocity $\omega$ is below the first reference angular velocity $K_0 VF + K_1$ while the vehicle speed VF is higher than the first reference vehicle speed $VL_1$ and the steering wheel is turned, the shock absorbers 6 through 9 still remain in the softer dampening mode.

When the steering angular velocity $\omega$ exceeds the first reference angular velocity $K_0 VF + K_1$ such as at the time the vehicle runs into a curve while moving at a speed higher than the first reference vehicle speed $VL_1$, the program goes out on the YES side of the step 115 to a step 118 in which the shock absorbers 6 through 9 are operated in the harder dampening mode. Then, a step 119 is executed to set a prescribed time $T_0$ in the timer counter. The time $T_0$ is a fixed time or determined dependent on the vehicle speed. In case the time $T_0$ is to be dependent on the vehicle speed, it should be either (a) increased as the vehicle speed becomes progressively higher or (b) at a maximum when the vehicle runs at a high speed such as about 80 km/h and be reduced as the vehicle speed becomes progressively lower than about 80 km/h.

Subsequently, provided the vehicle speed VF is higher than the first reference vehicle speed $VL_1$ and the steering angular velocity $\omega$ is higher than the first reference angular velocity $K_0 VF + K_1$, a closed loop composed of the steps 102 through 110, 114, 115, 118, 119 is selected and executed to maintain the shock absorbers 6 through 9 in the harder dampening mode.

When the steering angular velocity $\omega$ becomes lower than the first reference angular velocity $K_0 VF + K_1$, or the vehicle speed VF is reduced below the first reference vehicle speed $VL_1$, the steps 110, 114, 115 are executed, or the steps 110, 111 are executed, and then the step 117 is executed. Since the shock absorbers 6 through 9 are in the harder dampening mode, the program goes out on the YES side of the step 117 to a step 120 which determines whether the steering angular velocity $\omega$ is lower than or equal to a second reference angular velocity $K_4$ ($K_4$ is a positive constant smaller than the constant $K_1$). If the steering angular velocity $\omega$ is not below or equal to the second reference angular velocity $K_4$, then the step 119 is selected and the time $T_0$ is set in the timer counter.

If the steering angular velocity $\omega$ is below the second reference angular velocity $K_4$ when the steering operation by the driver is sufficiently stabilized, a step 121 is executed to decrement the timer counter in which the time $T_0$ has been set. Then, the program goes to a step 122 for determining whether the time $T_0$ has elapsed after the timer counter has started being decremented. If the time $T_0$ has not elapsed, then the program goes along the NO path from the step 122 back to the step 102. Thus, the shock absorbers 6 through 9 are still maintained in the harder dampening mode.

If the time $T_0$ has elapsed, then the program goes through the YES path from the step 122 to the step 112 to bring the shock absorbers 6 through 9 into the softer dampening mode. Then, the timer counter is cleared in the step 113.

If the step 114 determines that the steering wheel is returned, then a step 116 is executed to determine whether the vehicle speed VF is higher than or equal to a third reference angular velocity $K_2 VF + K_3$ ($K_2$ is a negative constant and $K_3$ is a positive constant). If the decision of the step 116 is "NO", then the program goes from the step 116 to the step 117, and if the decision of the step 116 is "YES", then the program goes from the step 116 to the step 118.

As is apparent from the flowchart of FIG. 5, the steering angular velocity is used as a parameter for changing the shock absorber mode from the softer dampening mode to the harder dampening mode only when the steering angle exceeds the reference angle $\theta$. Therefore, the shock absorbers are prevented from entering the harder dampening mode while the vehicle is driven with the steering wheel moving slightly back and forth or running on a bumby road. The shock absorbers 6 through 9 are shifted from the softer dampening mode to the harder dampening mode only when the steering angular velocity $\omega$ is higher than the first reference angular velocity $K_0 VF + K_1$ while the vehicle speed VF exceeds the first reference vehicle speed $VL_1$. The shock absorbers 6 through 9 are returned from the harder dampening mode to the softer dampening mode when the vehicle speed VF falls below the second reference vehicle speed $VL_2$ or when the steering angular velocity $\omega$ is continuously below the second reference angular velocity $K_4$ for the time $T_0$.

The first reference angular velocity $K_0 VF + K_1$ and the second reference angular velocity $K_2 VF + K_3$ are dependent on the vehicle speed VF given as a parameter. Therefore, the shock absorbers 6 through 9 are changed to the harder dampening mode when the steering wheel is angularly moved to a relatively small angular extent while the vehicle speed VF is high, or when the steering wheel is angularly moved to a relatively large angular extent while the vehicle speed VF is low. The shock absorbers 6 through 9 can thus be controlled to match actual running conditions in which the vehicle turns around corners.

By setting the greater reference angular velocity when the steering wheel is turned than when the steering wheel is returned, no unwanted harder dampening mode is selected for the shock absorbers when the steering wheel is returned or when the vehicle runs on winding roads such as mountain roads for example. Accordingly, the shock absorbers can be brought into the harder dampening mode only when such mode is required.

Since the harder dampening mode continues for the time set on the timer counter, the dampening forces produced by the shock absorbers are prevented from varying frequently and hence the vehicle can turn corners or run winding roads stably particularly when the steering wheel is required to be alternately turned and returned or the steering angle is varied from time to time on a curved road having a varying curvature.

Although a certain preferred embodiment of the present invention has been shown and described in detail, it should be understood that various changes and modifications may be made therein without departing from the scope of the appended claims.

What is claimed is:

1. A shock absorber control system for controlling at least one shock absorber having a dampening force adjustable in response to operation of steering means of a vehicle, said shock absorber control system comprising:
    (a) signal generator means for generating a signal in response to operation of the steering means; and
    (b) control means including first means responsive to the signal from said signal generator means for determining whether the steering means is turned or returned, second means responsive to the signal from said signal generator means for computing an angular velocity of operation of the steering means, third means for comparing the computed angular velocity with a reference value to issue a first signal indicative of an increased dampening force when the computed angular velocity exceeds said reference angular velocity and to issue a second signal indicative of a reduced dampening force when the computed angular velocity is below said reference angular velocity, said reference angular velocity being smaller when the steering means is determined as being turned by said second means than when the steering means is determined as being returned, and fourth means for actuating the shock absorber to selectively produce said increased and reduced dampening forces in response to said first and second signals, respectively.

2. A shock absorber control system according to claim 1, including fifth means for generating a signal in response to a speed of travel of the vehicle, said reference angular velocity being inversely proportional to said signal generated by said fifth means.

3. A shock absorber control system according to claim 1, wherein said signal generator means comprises a pair of steering sensors responsive to angular movement of the steering means through each unit angle for generating two out-of-phase pulse signals indicative respectively of an angular displacement or steering angle of the steering means and a direction in which the steering means is angularly moved.

4. A shock absorber control system according to claim 3, wherein said control means is programmed to perform the steps of correcting a centering position of the steering means when the vehicle travels for a predetermined distance while the steering angle of the steering means is smaller than a reference angle, computing an actual steering angle of the steering means based on the signals from said steering sensors and the centering position of the steering means, and determining whether the steering means is turned or returned on the basis of said signal indicative of the direction of rotation of the steering means from said steering sensor, said centering position, and said actual steering angle of the steering means.

5. A shock absorber control system according to claim 1, wherein said control means is programmed to perform the steps of computing a steering angle of the steering means based on the signal from said signal generator means, and generating said first signal only when said computed steering angle exceeds a reference angle.

6. A shock absorber control system according to claim 5, wherein said reference angle is variable dependent on a speed of travel of the vehicle.

7. A shock absorber control system for controlling at least one shock absorber having a dampening force adjustable in response to operation of a steering means of a vehicle, said shock absorber control system comprising:

(a) signal generator means for generating a signal in response to operation of the steering means; and (b) control means including first means responsive to the signal from said signal generator means for determining whether the steering means is turned or returned, second means responsive to the signal from said signal generator means for computing an angular velocity of operation of the steering means, third means for comparing the computed angular velocity with a first reference value to issue a first signal indicative of an increased dampening force when the computed angular velocity exceeds said first reference angular velocity, for comparing the computed angular velocity with a second reference angular velocity when the computed angular velocity is smaller than said first reference angular velocity, and for issuing a second signal indicative of a reduced dampening force a period of time after the computed angular velocity falls below said second reference angular velocity, and fourth means for actuating the shock absorber to selectively produce said increased and reduced dampening forces in response to said first and second signals, respectively.

8. A shock absorber control system according to claim 7, wherein said period of time is variable dependent on a speed of travel of the vehicle.

9. A shock absorber control system for controlling at least one shock absorber having a dampening force adjustable in response to operation of steering means of a vehicle, said shock absorber control system comprising:

(a) signal generator means for generating a signal in response to operation of the steering means; and (b) control means including first means responsive to the signal from said signal generator means for selectively generating a first signal indicating that the steering means is turned and a second signal indicating that the steering means is returned, second means responsive to the signal from said signal generator means for generating a third signal indicative of an angular velocity of operation of the steering means, third means responsive to said third signal for issuing a fourth signal indicative of an increased dampening force when said first signal is generated by said first means and a fifth signal indicative of a reduced dampening force when said second signal is generated by said first means, and fourth means for actuating the shock absorber to selectively produce said increased and reduced dampening forces in response to said fourth and fifth signals, respectively.

* * * * *